United States Patent [19]

Reid

[11] 4,266,662
[45] May 12, 1981

[54] TROUGH ROLLER ASSEMBLY

[76] Inventor: Rod B. Reid, 2616 Sky Dr., Missoula, Mont. 59801

[21] Appl. No.: 16,901

[22] Filed: Mar. 2, 1979

[51] Int. Cl.³ .............................................. B65G 39/12
[52] U.S. Cl. ................................... 198/829; 29/116 R
[58] Field of Search ............... 198/825, 828, 829, 830; 29/116 R; 308/20; 193/37

[56] References Cited

U.S. PATENT DOCUMENTS

| | | | |
|---|---|---|---|
| 770,015 | 9/1904 | Merrill | 198/825 X |
| 3,096,874 | 7/1963 | Wooldridge | 198/829 |
| 3,545,602 | 12/1970 | McCuliagh | |
| 3,648,824 | 3/1972 | Speck | 198/829 X |
| 4,029,200 | 6/1977 | Dillon | 198/830 |
| 4,032,002 | 6/1977 | Jackson | 198/825 X |

*Primary Examiner*—Jeffrey V. Nase

*Attorney, Agent, or Firm*—Wells, St. John & Roberts

[57] ABSTRACT

An idler trough roller assembly adapted to be mounted along a supporting frame to support the upper flight of a belt conveyor during movement of bulk material. Fixed angular supports are mounted on the frame. Each support has an outside cylindrical surface. The cylindrical surfaces of the individual supports are discontinued along a plane that forms an acute angle relative to the support axis. Individual rollers are fitted about each support. The rollers are each cup-shaped, with coaxial cylindrical inside and outside surfaces and an integral cap enclosing and completely covering the roller outer end. A radially projecting shoulder at the outer end of each support and an interfitting groove within each roller prevent axial movement of the assembled roller with respect to the support.

12 Claims, 6 Drawing Figures

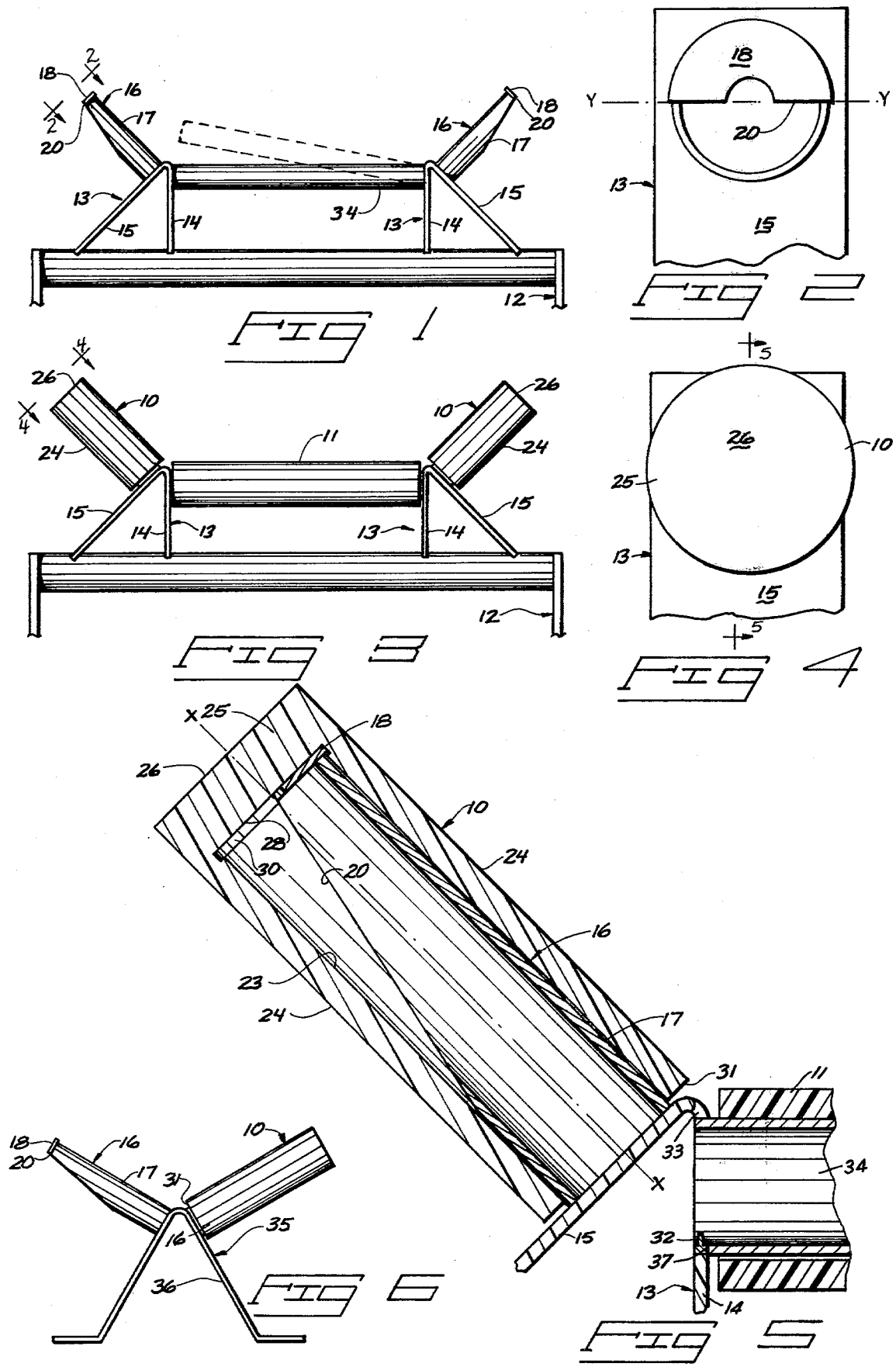

TROUGH ROLLER ASSEMBLY

BACKGROUND OF THE INVENTION

1. Field of the Invention

This invention relates to idler trough roller assemblies which support the upper flights of belt conveyors for bulk materials. The roller assemblies include wing rollers extending upwardly and outward at each side, adapted to maintain the belt in a trough configuration. Intermediate central transverse rollers can be utilized between the wing rollers. This invention pertains to the structure of the wing rollers and their supports.

2. Description of the Prior Art

The general nature of troughed rollers for bulk material handling is described in U.S. Pat. No. 4,029,200 issued June 14, 1977 to Dillon. This patent discloses a lightweight enclosed plastic roller structure that receives stub shafts at each end.

U.S. Pat. No. 4,032,002, which was granted June 28, 1977 to Jackson describes cantilevered rollers for a trough conveyor idler assembly. The outer ends of the respective rollers are retained on support shafts that extend through the length of each roller. The roller assemblies are loosely mounted to enable individual rollers to tilt about a pivot axis in the forward direction relative to movement of the belt.

U.S. Pat. No. 3,545,602 which was granted on Dec. 8, 1970 to McCullagh describes rollers mounted on shafts in which the shafts have flattened sections at each end to enable the rollers to be easily mounted or removed for replacement purposes. Again, the support shafts extending through the rollers protrude beyond each roller end.

It is an object of this invention to improve upon the prior roller structures in trough roller assemblies by utilizing a cup-shaped roller made of plastic and requiring no internal bearings for support. The integral cup-shaped nature of the roller prevents entry of dirt or materials between the individual rollers and their respective support members.

Another object of this invention is to provide a roller assembly requiring a minimum number of parts, facilitating replacement of the rollers without disengaging any elements other than the rollers themselves.

These objects and others will be evident from the following disclosure.

DESCRIPTION OF THE DRAWINGS

FIG. 1 is a transverse elevational view of the roller supports in a first embodiment of the invention;

FIG. 2 is an enlarged fragmentary end view taken along line 2—2 in FIG. 1;

FIG. 3 is a transverse elevational view of the completed trough roller assembly;

FIG. 4 is an enlarged fragmentary end view taken along line 4—4 in FIG. 3;

FIG. 5 is an enlarged fragmentary sectional view through the rollers and supports at one end of the assembly as seen along line 5—5 in FIG. 4; and FIG. 6 is a transverse elevational view of a second embodiment of the invention, with one roller removed at one side of the assembly.

DESCRIPTION OF THE PREFERRED EMBODIMENTS

Troughed conveyors are commonly used for maintaining loose or bulk material on an endless conveyor belt. The upper or working flight of the belt is carried by rollers spaced along the length of the flight and arranged angularly to form a depression or trough along the center of the belt.

Conventional trough roller assemblies for supporting the working flight of a conveyor belt are made of metal to provide adequate strength or support of the loaded belt. Bearings have been used for supporting the rollers, but bearing failure is encountered because of their exposure to moisture or abrasive material. Metal rollers also require lubrication and maintenance under difficult working conditions.

The present apparatus eliminates the need for lubrication by providing rollers made of lighter plastic material substantially supported by complementary fixed cylindrical surfaces. The lighter weight of the rollers, in comparison to the weight of metal rollers, requires less horsepower for operation of the conveyor and reduces the energy requirements of the system. Most importantly, the cup-shaped roller structure totally prevents the entrance of moisture or foreign materials to the support surfaces for the rollers by totally enclosing the outer end of each roller.

FIGS. 1 through 5 illustrate in detail the form of the invention including horizontal center rolls. FIG. 6 shows a modification where the horizontal center rolls are not utilized. The same wing or side roller assembly is used in both forms and identical reference numerals are used to specify the elements in each which are identical to one another.

The troughed roller assembly shown in FIGS. 1 and 3 incorporates a pair of side or wing rollers 10 and a central roll 11. The central roll 11 is a transverse horizontal support for the longitudinal conveyor belt (not shown). The side rollers 10 extend upwardly and outward to each side of the roller assembly to form a longitudinal trough within the belt.

The support apparatus for the rollers 10 and rolls 11 is generally shown in the form of a transverse framework 12 that would be suitably fixed along the path of the working flight of the belt conveyor. Framework 12 extends transverse to the length of the conveyor belt. It has a pair of upstanding brackets 13 fixed to its upper surfaces. Each bracket 13 includes a vertical leg 14 and an integral angular leg 15. The bracket 13 may be fabricated or otherwise formed from metal plates or sheets.

The side rollers 10 are carried by individual supports 16. Each support 16 is preferably made of metal and has a cylindrical outside surface 17 of substantial diameter. Each support 16 is fixed to the outwardly facing surface of an angular leg 15 of one bracket 13. The central axis X—X of each support 16 is preferably perpendicular to the outer surface of the angular leg 15, although a different angular relationship might be presented in a specific bracket arrangement.

Each support 16 terminates at a radially protruding shoulder 18 located at its outer end. Furthermore, the cylindrical outside surface 17 and shoulder 18 are discontinued along a lower edge 20. The lower edge 20 extends between a horizontal line Y—Y at the outer surface of support 16 (FIG. 2) and intersects the lowermost portion of the cylindrical outside surface 17 at a location adjacent to bracket 13. The lower edge 20 is formed within a plane presenting an acute angle with respect to the support axis X—X (FIG. 5). The horizontal line Y—Y should either intersect the support axis X—X or be located elevationally above it. The outer end of support 16 is therefore in an arcuate shape not greater than a semicircle, which permits each roller 10 to be fitted over the support 16 and shoulder 18 because of the clearance provided within the roller by the inclined lower edge 20.

The details of the rollers 10 and their relationship to the support 16 are best seen in FIG. 5. Each roller 10 is preferably molded or otherwise fabricated as an integral unit, using suitable plastic material capable of rotational movement on the support 16 without lubrication. Plastic materials having lubricating qualities are well known in the related areas of bearing and roller design.

The rollers 10 comprise a cylindrical inside surface 23 and a coaxial outside cylindrical surface 24. The surfaces 23 and 24 are constant throughout the length of each roller 10. The roller structure further comprises an integral cap 25 that completely encloses the outer end of each roller. Cap 25 as shown has parallel planar outside surfaces 26 and inside surfaces 28.

The inside cylindrical surface 23 of each roller 10 is interrupted adjacent the cap 25 by an annular groove 30 which is coaxial with the cylindrical surfaces 23, 24. The axial location, width and depth of the groove 30 are complementary to the location and size of shoulder 18, thereby enabling shoulder 18 to be received within the groove 30 of a roller 10 rotatably mounted on each support 16. The shoulder 18 interacts with the groove 30 to prevent axial movement of each roller 10 with respect to the support 16. The interfitting relationship between shoulder 18 and groove 30 is utilized to maintain rollers 10 in place during use of the roller support apparatus.

As shown, the inside surface 23 of each roller 10 bears against the outer surfaces of the shoulder 18 on support 16. The inner end 31 of each roller 10 is spaced slightly from the surfaces of the angular leg 15 to minimize frictional resistance to rolling.

The diameter of the inside cylindrical surface 23 of each roller 10 closely approximates the outer diameter of the cylindrical outside surface 17 of each support 16. This provides maximum contact area between the rotatable rollers 10 and the stationary support 16 for load transfer to the framework 12. As an example, the difference in diameter between the surfaces 17 and 23 might be on the order of 0.030 to 0.050 inches.

The central roll 11 is illustrated as a tubular cylindrical member, made of the plastic materials mentioned above, and rotatably supported on a central support 34. The central support 34 is a complementary member made from tubular metal. It has a simple cylindrical surface configuration extending between the vertical legs 14 of the brackets 13. The support 34 is loosely cradled within complementary slots 33 formed at the upper ends of each vertical leg 14. At the base of one slot 33 is an upwardly projecting pin 32 which is received within a complementary recess 37 at the corresponding end of support 34. The pin 32 and recess 37 form an interlock to prevent rotation of support 34 about its central axis relative to brackets 13.

FIG. 6 illustrates a form of the invention wherein the roller support does not include a horizontal central roll. The only difference between the structure shown in FIG. 6 and that shown in FIGS. 1 through 5 is that the supports 16 are cantilevered from a single central bracket 35 having a pair of symmetrical diverging legs 36. The remaining elements of the structure shown in FIG. 6 have been described in detail above.

The rollers 10 can be readily exchanged or replaced as necessary due to wear or other operational difficulties. They can be fitted over the outer ends of the cantilevered supports 16 without requiring removal of any framework elements or any structural adjustments. No special tools or skills are required for such replacement.

The cup-shaped rollers 10 eliminate all problems concerning entry of moisture or foreign material through the outer ends of the rollers 10. By having the roller caps 25 formed integrally with the cylindrical side walls of each roller, there are no seams or areas of stress which might fail under working loads. Maintenance of the conveyor is minimized in comparison with conventional devices and lubrication schedules and procedures are eliminated.

Having described my invention, I claim:

1. A roller assembly, comprising:
   a supporting bracket;
   a cantilevered support having an inner end fixed to said bracket and having an outer end spaced therefrom, said support having a stationary cylindrical outside surface generated about a central axis;
   a radial shoulder on said support projecting beyond the outside surface thereof;
   a tubular cylindrical roller coaxially mounted about said support and having coaxial inner and outer surfaces, the inner surface of said roller being in slidable engagement with the outside surface of said support;
   a transverse cap in axial abutment with the outer end of said support and enclosing one end of the roller;
   said roller inner surface being open at the remaining end of the roller and having an inside diameter complementary to the diameter of the cylindrical outside surface of said support;
   and an internal annular groove formed about the inner surface of said roller, said groove having a diameter greater than said inside diameter and being axially located along the length of the roller at a position corresponding to the axial location of the shoulder on said support, the depth and width of the groove being such that said shoulder is freely received within the groove;
   said shoulder and the cylindrical outside surface of said support being discontinued along a first plane forming an acute angle with respect to said central axis.

2. A roller assembly as set out in claim 1 wherein the central axis of said support extends upwardly and outward from said bracket within a vertical plane.

3. A roller assembly as set out in claim 1 wherein the central axis of said support extends upwardly and outward from said bracket within a vertical plane; and
   wherein said first plane intersects the outer end of said support along a horizontal line.

4. A roller assembly as set out in claim 1 wherein the central axis of said support extends upwardly and outward from said bracket within a vertical plane; and
   wherein said first plane intersects the outer end of said support along a horizontal line that in turn intersects or is located elevationally above said central axis.

5. A roller assembly as set out in claim 1 wherein the central axis of said support extends upwardly and outward from said bracket within a vertical plane; and
   wherein said first plane intersects the outer end of said support along a horizontal line that in turn intersects or is located elevationally above said central axis;

said first plane also intersecting the lowermost portion of the cylindrical outside surface of said support at an axial location adjacent its inner end.

6. A troughed roller assembly for use in a belt conveyor system comprising:

a supporting framework;

a pair of side roller assemblies identical to one another and mounted to said framework, each side roller assembly comprising:

a fixed cantilevered support having a cylindrical outside surface formed about a transverse axis between an inner end and an outer end thereof, the axes of the respective supports being extended upwardly and outward in opposed transverse directions;

and a roller surrounding said support, each roller being coaxially fitted about a support for free rotational movement about the transverse axis of the support in sliding engagement with the outside surface thereof;

each roller having an outer cylindrical surface terminating at a cap that is an axial abutment with the outer end of the support on which the roller is fitted and which encloses the outer end of the roller;

each support having a radial shoulder projecting beyond its cylindrical outside surface at the outer end of the support;

each roller having an internal annular groove formed therein adjacent said end cap;

each shoulder being freely received within the groove of the roller fitted about the support;

said shoulder and the cylindrical outside surface of each support being discontinued along a plane that forms an acute angle with respect to the transverse axis of the support.

7. A troughed roller assembly as set out in claim 6 wherein the caps are formed as an integral element of each roller.

8. A troughed roller assembly as set out in claim 6 wherein the axial length of each support is less than the outer axial dimension of each roller.

9. A troughed roller assembly as set out in claim 6 wherein the axial length of each support is less than the outer axial dimension of each roller and less than the inner axial dimension of each roller.

10. A troughed roller assembly as set out in claim 6 wherein said plane intersects the outer end of the support along a horizontal line.

11. A troughed roller assembly as set out in claim 6 wherein said plane intersects the outer end of the support along a horizontal line, and further intersects the transverse axis of the support.

12. A troughed roller assembly as set out in claim 6 wherein said plane intersects the outer end of the support along a horizontal line, and further intersects or is located above the transverse axis of the support.

* * * * *